May 22, 1956     F. M. SCHROEDER     2,746,821
AUTOMOBILE STEERING WHEEL TABLE
Filed March 14, 1955
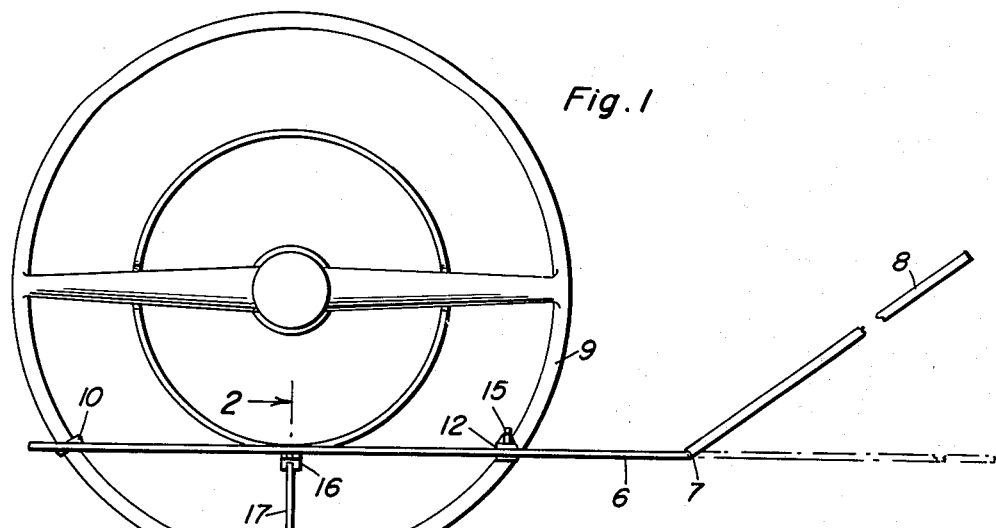
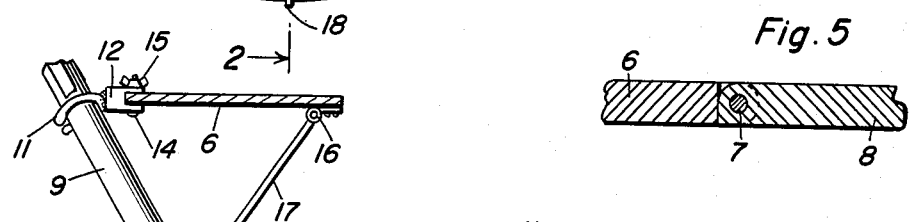
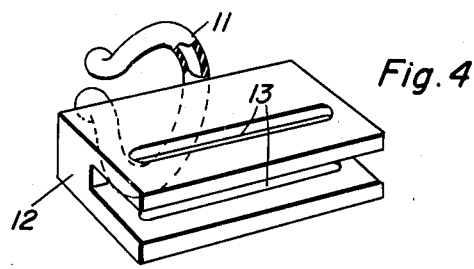
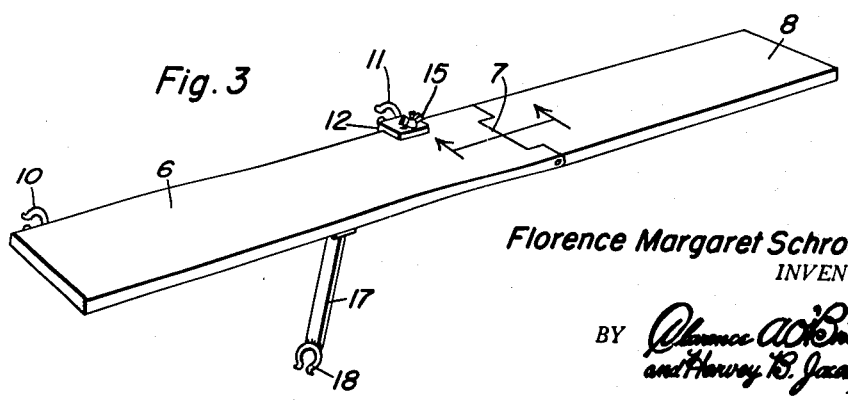
Florence Margaret Schroeder
INVENTOR.

United States Patent Office 2,746,821
Patented May 22, 1956

---

2,746,821

AUTOMOBILE STEERING WHEEL TABLE

Florence Margaret Schroeder, Dubuque, Iowa

Application March 14, 1955, Serial No. 494,053

1 Claim. (Cl. 311—21)

The present invention relates to new and useful improvements in automobile service trays or tables for use particularly at drive-in restaurants and has for its primary object to provide, in an manner as hereinafter set forth, a removable device of this character which is adapted to be expeditiously and firmly secured in position for use on the usual steering wheel of the vehicle.

Another very important object of the invention is to provide an automobile service tray or table of the aforementioned character which may be conveniently used by all of the occupants of the operator's seat of the vehicle.

Still another important object of the invention is to provide an automobile service tray or table of the character described which, when not in use, may be compactly folded for storage in the vehicle.

Another object of the invention is to provide, in a manner as hereinafter set forth, an automobile service tray or table of the character set forth which may be readily mounted on steering wheels of various sizes.

Other objects of the invention are to provide an automobile service tray or table which will be comparatively simple in construction, strong, durable and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation, showing a service tray or table embodying the present invention in position on a steering wheel;

Figure 2 is a vertical sectional view, taken substantially on the line 2—2 of Figure 1;

Figure 3 is a perspective view of the device;

Figure 4 is a detail view in perspective of the adjustable clamp; and

Figure 5 is a fragmentary view in longitudinal section, taken substantially on the line 5—5 of Figure 3.

Referring now to the drawing in detail, it will be seen that the embodiment of the invention which has been illustrated comprises an elongated panel 6 of suitable dimensions and material. Secured for swinging movement by a half hinge 7 on one end of the panel 6 is a foldable extension 8.

Panel 6 is adapted to be removably mounted on the usual steering wheel of an automobile, as at 9. Toward this end, the panel 6 has mounted on one of its longitudinal edges, adjacent the ends thereof, substantially C-shaped, resilient stationary and adjustable clamps 10 and 11, respectively. The clamp 11 is fixed on the bight portion of a substantially U-shaped clip 12 which is removably and adjustably mounted on the panel 6. The clip 12, in the embodiment shown, is provided with slots 13 in its leg portions. The transverse slots 13 accommodate a bolt 14 which passes through the panel 6 and which has threaded thereon a wing nut 15.

Hingedly mounted at 16 beneath the front portion of the panel 6 at an intermediate point, is a leg 17. The leg 17 is provided on its free end with a substantially C-shaped clamp 18 for the reception of the rim of the steering wheel 9.

It is thought that the manner in which the device is used will be readily apparent from a consideration of the foregoing. Briefly, to mount the table on a wheel, the clamps 10 and 11 are engaged with the lower side portions of said wheel. The clamp 18 on the lower or free end of the leg 17 is then engaged with the wheel for supporting the panel 6 in a substantially horizontal position. The half hinge 7 supports the extension 8 in a substantially horizontal position on the panel 6. The extension 8, in conjunction with the stationary panel 6, provides a table of sufficient length to accommodate all of the occupants of the driver's seat of the vehicle. To mount the device on steering wheels of different sizes or diameters, the wing nut 15 is loosened to permit the clip 12 with the clamp 11 thereon to be adjusted longitudinally on the panel 6. Of course, the adjustment is secured by again tightening the wing nut 15.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

An automobile service table including a transversely elongated horizontal panel, and means for removably mounting said panel on automobile steering wheels of various diameters, said means comprising a substantially C-shaped, resilient clamp fixedly mounted on the front edge of the panel adjacent one end thereof and engageable with the rim of the wheel, a substantially U-shaped clip mounted for sliding adjustment on the front marginal portion of the panel adjacent the other end thereof and having transverse slots in its leg portions, a substantially C-shaped, resilient clamp fixed on the bight portion of said clip and engageable with the wheel rim, a vertical bolt extending through the panel and engaged in the slots, a wing nut threaded on said bolt for frictionally securing the clip in adjusted position on the panel, a leg pivotally suspended beneath the rear portion of the panel, and a substantially C-shaped, resilient clamp on the free end of said leg engageable with the rim for supporting the panel in a substantially horizontal position thereon in conjunction with the first and second named clamps.

References Cited in the file of this patent

UNITED STATES PATENTS

| | | |
|---|---|---|
| 1,780,706 | Goldbecher | Nov. 4, 1930 |
| 1,891,834 | Pendleton | Dec. 20, 1932 |
| 1,900,325 | Bayman et al. | Mar. 7, 1933 |
| 2,299,025 | McGinley | Oct. 13, 1942 |
| 2,584,557 | Cuthbertson | Feb. 5, 1952 |
| 2,693,400 | Erickson | Nov. 2, 1954 |
| 2,718,445 | Wilson | Sept. 20, 1955 |